United States Patent [19]

Fujiwhara et al.

[11] 4,368,258
[45] Jan. 11, 1983

[54] PROCESS FOR PREPARING IMPREGNATED POLYMER LATEX COMPOSITIONS

[75] Inventors: Mitsuto Fujiwhara; Syunji Matsuo; Tsuneo Wada; Naoto Abe; Toyoaki Masukawa; Akio Iijima; Keiji Oishi, all of Hino, Japan

[73] Assignee: Konishiroku Photo Industry Co., Ltd., Tokyo, Japan

[21] Appl. No.: 242,580

[22] Filed: Mar. 11, 1981

Related U.S. Application Data

[63] Continuation of Ser. No. 74,070, Sep. 10, 1979, abandoned, which is a continuation-in-part of Ser. No. 932,495, Aug. 10, 1978, abandoned.

[30] Foreign Application Priority Data

Aug. 17, 1977 [JP] Japan .................................. 52-98566

[51] Int. Cl.$^3$ .......................... G03C 1/40; G03C 1/48; G03C 1/10; G03C 1/72
[52] U.S. Cl. .................................. 430/493; 252/306; 252/310; 252/314; 252/327; 430/222; 430/486; 430/510; 430/512; 430/546; 430/559; 430/564; 430/566; 430/627; 430/629; 430/631; 430/635; 430/636; 430/644

[58] Field of Search ............... 430/222, 631, 546, 627, 430/635, 636, 169, 510, 512, 517, 541, 559, 566, 495, 564, 644, 629, 486, 493; 252/306, 310, 314, 327; 260/29.6 AQ, 29.6 R, 29.6 ME, 29.6 MQ, 29.6 MN, 29.6 H

[56] References Cited

U.S. PATENT DOCUMENTS

| | | | |
|---|---|---|---|
| 2,772,163 | 1/1956 | Tong | 430/546 |
| 3,518,088 | 6/1970 | Donn et al. | 430/566 |
| 3,619,195 | 1/1971 | Van Campen | 430/627 |
| 4,133,689 | 1/1979 | Chen et al. | 430/627 |

Primary Examiner—Richard L. Schilling
Attorney, Agent, or Firm—Frishauf, Holtz, Goodman & Woodward

[57] ABSTRACT

In the process for preparing impregnated polymer latex compositions by impregnating a hydrophobic substance in dispersed polymer particles in an aqueous polymer latex, the improvement comprises impregnating said hydrophobic substance, wherein the impregnation is effected by mixing said hydrophobic substance which is solid state, a water-miscible organic solvent and aqueous polymer latex wherein a polymer of the polymer latex is prepared from ethene monomers and containing at least one hydrophilic group.

17 Claims, No Drawings

PROCESS FOR PREPARING IMPREGNATED POLYMER LATEX COMPOSITIONS

This is a continuation of application Ser. No. 74,070 filed Sept. 10, 1979, which, in turn, is a continuation-in-part of Ser. No. 932,495, filed Aug. 10, 1978, both cases now abandoned.

The invention relates to a process for immersing a hydrophobic substance in dispersed polymer particles within an aqueous polymer latex. More particularly, it relates to a process for preparing polymer latex compositions in which a hydrophobic photographic additive is impregnated.

In the preparation of light-sensitive silver halide photographic materials, there have been employed several methods to disperse uniformly various hydrophobic compounds, particularly dye-forming agents or UV absorbents in a hydrophilic colloidal solution such as gelatin.

One of the methods comprises mixing a solid or liquid hydrophobic compound (I) with a hydrophobic colloidal solution (II), dispersing (I) mechanically within (II) by passing the resulting mixture through a high energy mill such as a colloid mill several times to make a dispersion, and finally dispersing the dispersion in a hydrophilic colloidal solution. However, the method involves several defects that an insufficient dispersion is apt to take place and the resulting dispersion is often unstable. Further, in this method, a large quantity of energy is required to attain the fine pulverization of (I) to the desired extent and the sufficient dispersion.

The consumption of such a large quantity of energy often accompanies an accumulation of heat or an undesirable partial heating which causes chemical changes of ingredients involved.

Another method of dispersing a hydrophobic compound in a hydrophilic colloidal solution is disclosed in U.S. Pat. Nos. 2,304,940 and 2,322,027 in which a hydrophobic compound is first dissolved in an oil or a solvent having a high boiling point to make a solution, and then, the resulting oily solution is dispersed in a hydrophilic colloidal solution. A modification of the method is disclosed e.g. in U.S. Pat. No. 2,801,171 in which an auxiliary solvent having a low molecular weight such as ethyl acetate or a lower ketone may optionally be used for accelerating the solubilization of the hydrophobic compound into the oily solvent.

In the preparation of silver halide color photographic emulsion comprising a ballasted dye-forming agent (hereinafter referred to as "coupler"), there has been extensively employed a method in which a ballasted coupler is dissolved in an oily solvent having a high boiling point called "coupler solvent" and the resulting solution is dispersed in a hydrophilic colloidal solution such as silver halide gelatin emulsion.

Even by this method, a finely pulverizing process with a high energy is required to attain the dispersion and the grain size to the desired extent, by which process undesirable degradation of some ingredients in the finely pulverized composition, such as thermal degradation, takes place.

In addition, the finely pulverizing process requires a long time and a high cost.

It has, therefore, been desired to improve methods of dispersing a hydrophobic compound such as a ballasted coupler uniformly in a photographic emulsion or other hydrophilic colloidal solutions.

For this purpose, it must be avoided to employ a high energy mill which has been used for the dispersion of a hydrophobic substance in a hydrophilic colloidal solution.

In the meantime, Japanese Patent Publication Specification No. 48-30494 discloses a method of using a water-miscible and organic solvent-miscible polymer for the dispersion of a hydrophobic coupler, in order to improve the photographic characteristics such as image preservability. Here again, it is essential to employ a high energy mill for the emulsification of the polymer containing the coupler.

Japanese Patent Publication Specification Nos. 51-59942 and 51-59943, as laid open to public inspection, disclose a method which may give photographic emulsions various advantages without employing a high energy mill which causes various disadvantages mentioned above. Here is used a polymer latex in which a hydrophobic substance is impregnated in dispersed polymer particles; and the hydrophobic substance is dispersed in a hydrophilic colloidal solution, while keeping the hydrophobic substance impregnated in the dispersed polymer particles. By using a polymer latex, the method can provide the thus obtained silver halide photographic emulsion with several desirable characteristics. Namely, the grain size of the dispersion containing a coupler is smaller than those obtained by other known methods, by which the definition of image to be obtained and the reactivity of the coupler with a developer may be improved.

Further, hydrophobic compounds which could not have been used due to the susceptibility of oxidation may be introduced into a hydrophilic colloidal solution according to the method, imparting a remarkable oxidation resistance to the hydrophobic compounds.

Furthermore, hydrophobic substances which are so reactive as to react with other ingredient in a layer may be used, suppressing the reactivity, by employing a polymer latex.

Although the use of a polymer latex as the dispersed support of hydrophobic photographic additives has attained the improvement of photographic characteristics without employing a high energy mill, there still remain several problems to be solved.

First, according to the above-mentioned invention, the quantity of hydrophobic substance which can be immersed in the dispersed particles of the polymer latex is insufficient. Namely, when a coupler which is a typical hydrophobic photographic additive is impregnated in dispersed particles of the polymer latex, more than equal, and in some instances more than twice amounts by weight of the dispersed particles based on the coupler are required, and hence, light-sensitive materials prepared therefrom become thick in size and the developing properties as well as resolution thereof become worse. Secondly, according to the above method, the dispersion concentration of the polymer latex is relatively low, and hence, the polymer latex has to be used in large quantities by which the dry load is increased. Thirdly, a water-miscible organic solvent is used in relatively large quantities when the hydrophobic substance is impregnated in the dispersed particles because the hydrophobic substance has been solved in a water-miscible organic solvent before the impregnation and hence a large scale equipment and a long time are required for the removal of the solvent.

In addition, the above-mentioned invention involves defects that usable polymer latices are considerably restricted in species and the stability of the polymer latex compositions obtained are not sufficiently stable.

As mentioned above, the known methods failed to give satisfactory results and various problems still remain unsolved.

It is, therefore, an object of the invention to provide a process for preparing polymer latex compositions in which a hydrophobic substance is impregnated, without accompanying the above-mentioned defects and without using a high energy. It is another object of the invention to provide a process for preparing polymer latex compositions in which a large quantity of a hydrophobic substance is impregnated in the dispersed particles. It is still another object of the invention to provide a process for preparing polymer latex compositions in which a polymer latex containing dispersed particles in high concentration is used.

It is yet another object of the invention to provide a process for preparing polymer latex compositions which allows a ready impregnation of a hydrophobic substance in the dispersed particles and a ready removal of solvents after the impregnation.

It is a further object of the invention to provide a process for preparing polymer latex compositions which does not remarkably restrict the species of polymer latex to be employed.

The inventors have found, after investigations to achieve the above-mentioned objects, that the above-mentioned problems may be solved by impregnating a hydrophobic substance in dispersed polymer particles, by mixing a hydrophobic substance which is solid state, a water-miscible organic solvent and aqueous polymer latex. The solid state hydrophobic substance is gradually dissolved by the water-miscible solvent, while said dissolved hydrophobic substance is being impregnated into the dispersed polymer particles. In accordance with the process for preparing impregnated polymer compositions of the invention, the following superior effects may be obtained:

(1) The compositions are not degraded by the action of generating heat because no dispersing equipment with a high energy is required.

(2) Light-sensitive materials having a thin thickness may be prepared because a hydrophobic substance may be impregnated in large quantities in dispersed polymer particles. Thus, the developing properties and the resolution are improved at the same time.

(3) The dry load may be decreased because an aqueous polymer latex containing dispersant in high concentration may be used.

(4) Removal of solvent used may be performed over relatively short period and no large scale equipment for removing the solvent is required because an organic solvent is used in a small quantity upon impregnation.

(5) There is no remarkable limitation as to the species of aqueous polymer latex to be used. There may be used hydrophobic substances which may not have been used for impregnation and the resulting impregnated compositions are quite stable.

In the process of the invention, the following four methods of mixing an aqueous polymer latex, a hydrophobic substance and a water-miscible organic solvent are considered upon impregnating the hydrophobic substance in the dispersed polymer particles.

The first method comprises making a suspension of a hydrophobic substance in an aqueous polymer latex and then adding a water-miscible organic solvent to the suspension in small portions.

The second method comprises adding and mixing a hydrophobic substance and a water-miscible organic solvent from different hoppers to an aqueous polymer latex at the same time.

The third method comprises adding and mixing an aqueous polymer latex, a hydrophobic substance and a water-miscible organic solvent in one receptacle at the same time.

The fourth method comprises adding and mixing a hydrophobic substance to a mixture of an aqueous polymer latex and a water-miscible organic solvent.

Although the objects of the invention may be attained by any of the above-mentioned four methods, the first and fourth methods are preferable from the viewpoint of ready operation.

As the water-miscible organic solvent employed in the invention, those which are miscible with water at any proportion are most preferable. However, solvents which are miscible with water more than 10% by weight may be used in the invention.

As the solvents must be removed at a later stage, it is preferable that they boil at below 150° C., preferably below 100° C. The solvents may be used alone or admixed.

Further, the solvents may be used in admixture with a solvent havng a high boiling point such as dibutyl phthalate, tricresyl phosphate, triphenyl phosphate or diethyl laurylamide.

The solvents may also be used in admixture with a water-miscible solvent. Examples of such water-miscible solvents are acetone, methyl ethyl ketone, methanol, ethanol, isopropanol, tetrahydrofuran, N-methylpyrrolidone, dimethylformamide and dimethylsulfoxide.

The mixing ratio of organic solvents to water will be 0.1–10:1, preferably 0.7–3:1 by weight in the polymer latex dispersion.

The hydrophobic substance of the invention includes those which are soluble in water up to about 10%, preferably up to 5%, more preferably up to 2%, and most preferably up to 1%. Examples of the hydrophobic substances are agricultural chemicals, pharmaceuticals, dyes and, of course, photographic additives.

Representative hydrophobic photographic additives which may be impregnated by the process of the invention are couplers, UV absorbents, development inhibitor-releasing substances, cross-oxidation dye-releasing agents and photographic dyes. Also, fluorescent brightening agents, antihalation agents or antiirradiation agents and developing agents may be impregnated. More concretely, open chain methylene series yellow couplers, 5-pyrazolone series magenta couplers, phenol- or naphthol series cyan couplers, which may be either so-called two equivalents type or so-called four equivalents type, are mentioned as the hydrophobic couplers. The hydrophobic couplers may be used in combination with azo type colored couplers, osazone type compounds or diffusible dye-releasing couplers for automasking. Further, so-called compating couplers, DIR couplers (development inhibitor-releasing couplers) or BAR couplers (bleach accelerator-releasing couplers) may be used admixed in order to improve photographic characteristics.

There have been used open chain ketomethylene compounds as the yellow couplers. They are, for example, pivalylacetanilide type yellow couplers disclosed in U.S. Pat. No. 3,265,506; benzoyl-acetanilide type yellow couplers disclosed in British patent specification No. 1,240,600 and U.S. Pat. No. 2,875,051; active pointo-aryl substituted type compounds which are commonly referred to as two equivalents type couplers disclosed in U.S. Pat. No. 3,408,194; active point-o-amyl substituted type compounds disclosed in U.S. Pat. No. 3,447,928; active point-hydantoin substituted type compounds disclosed in British patent specification No. 1,351,424; active point-urazol substituted compounds and active point-succinimide substituted compounds disclosed in British patent specification No. 1,331,179; active point-mono-oxoimide substituted compounds and active point-fluorine substituted compounds disclosed in British patent specification No. 94,490; active point-chlorine or bromine substituted compounds disclosed in British patent specification No. 780,507; and active point-o-sulfonyl substituted compounds disclosed in British patent specification No. 1,092,506, and the like.

As the magenta couplers used in the invention are mentioned pyrazolone series, pyrazolotriazole series, pyrazolino-benzimidazole series and indazolone series compounds. They are, for example, pyrazolone series magenta couplers disclosed in U.S. Pat. Nos. 3,127,269; 2,600,788; 3,519,429; 3,419,391; 3,062,653 and 3,684,514 and British patent specification Nos. 1,342,553 and 1,399,306; pyrazolotriazole series magenta couplers disclosed in British patent specification No. 1,247,493; pyrazolinobenzimidazole series magenta couplers disclosed in U.S. Pat. No. 3,061,432 and indazolone series magenta couplers disclosed in British patent specification No. 1,335,603. Thereof, especially suitable for the process of the invention are those disclosed in U.S. Pat. Nos. 3,684,514 and 3,127,269.

As the cyan couplers used in the invention are mentioned, for example, phenol compounds disclosed in U.S. Pat. Nos. 2,423,730, 2,801,171 and 2,895,826; active point-o-aryl substituted naphthol compounds disclosed in U.S. Pat. No. 2,474,293 and British patent specification No. 1,084,480; phenol and naphthol compounds disclosed in Canadian Patent Specification No. 913,082 and U.S. Pat. No. 3,737,316.

As the colored magenta couplers, are employed compounds in which active points of a colorless magenta couplers are substituted with arylazo or heterocyclic aryl azo groups, for example, compounds disclosed in U.S. Pat. Nos. 3,005,712; 2,983,608; 2,801,171 and 3,684,514; and British patent specification No. 937,621.

As the colored cyan couplers, are employed active point-arylazo substituted compounds disclosed in U.S. Pat. Nos. 3,034,892; 2,521,908 and 3,811,892 and British patent specification No. 1,255,111. Masking couplers that react with oxidized developer to form dyes flowing into the processing solution disclosed in British patent specification No. 1,084,480 may also be employed.

As the competing couplers, are employed, for example, citrazinic acid or the like disclosed in U.S. Pat. No. 2,742,832. As Weiss couplers, are employed those disclosed in U.S. Pat. No. 2,998,314.

Further, so-called DIR substance (development inhibitor-releasing substance) disclosed in U.S. Pat. Nos. 3,632,345, 3,928,041; 3,958,993 and 3,961,959 are preferably employed.

As the UV absorbents, are employed triazoles, triazines and benzophenones or the like disclosed in U.S. Pat. Nos. 3,004,896; 3,253,921; 3,533,794; 3,292,525; 3,705,805; 3,738,837 and 3,754,919; British patent specification No. 1,321,355 and Japanese Patent Publication No. 50-25237, as laid open to public inspection, or the like.

Further, acrylonitrile series compounds disclosed in U.S. Pat. Nos. 3,052,636 and 3,707,535 may also be employed. It is preferable that a series of U.V. absorbents sold by Ciba-Geigy AG, Switzerland, under the trade names Tinuvin PS, Tinuvin 320, Tinuvin 326, Tinuvin 327 or Tinuvin 328 are used, alone or admixed, as the UV absorbent.

Furthermore, azoles disclosed in U.S. Pat. Nos. 2,537,877; 2,739,971; 2,739,888; 2,784,087 and 3,250,687 and high molecular triazine compounds disclosed in U.S. Pat. Nos. 3,512,984 and 3,549,374 may also be used.

As other hydrophobic photographic additives which may be readily impregnated according to the process of the invention are mentioned, for example, photographic dyes, disclosed in U.S. Pat. Nos. 2,751,298 and 3,506,443, DDR couplers (diffusible dye-releasing couplers) disclosed in U.S. Pat. Nos. 3,443,939; 3,443,940; 3,443,941 and 3,725,062; indicator dyes disclosed in U.S. Pat. No. 3,647,437; sulfonamide series reducing agents disclosed in U.S. Pat. No. 3,810,321; reductone series reducing agents disclosed in U.S. Pat. Nos. 3,672,896 and 3,679,426; bisnaphthol series reducing agents disclosed in U.S. Pat. Nos. 3,672,904 and 3,751,249; hydrophobic developers disclosed in U.S. Pat. Nos. 3,672,896; 3,672,904; 3,679,426 and 3,751,249; and DRR substances (dye-releasing redox material) which are so-called cross oxidation dye-releasing agents disclosed in U.S. Pat. Nos. 3,628,952; 3,698,897 and 3,725,062 and Belgian patent specification Nos. 788,268; 796,040; 796,041 and 796,042. Further, the process of the invention may be applied to photographic materials described in Product Licensing Index vol. 92, 110 (1971).

The hydrophobic substance may be dispersed in a dispersion medium of polymer latex in an amount of 1/100 to 1 part, preferably 1/50 to $\frac{1}{2}$ part by weight, based on 1 part of the dispersion medium.

It is presumed that the solubility of the hydrophobic substance in the medium is rather low, in the abovementioned mixing proportion. To wit, it is presumed that solubility of the hydrophobic substance in the dispersion medium would be below 1%. It is remarkable, however, that the hydrophobic substance may be readily and relatively rapidly dispersed in the medium containing polymer particles, in spite of the low solubility.

The aqueous polymer latex of the invention containing dispersed polymer particles are required that the polymer particles are finely dispersed in a medium comprising finally water and a water-miscible solvent.

The mean grain size of dispersed polymer particles which may be applied to the invention is below $5\mu$, preferably below $1\mu$, more preferably below $0.5\mu$. It is preferable that the particle size distribution is uniform such that particles whose grain size ranges from 70% to 130% with respect to the mean grain size are more than 70%, in number, among the total particles.

The aqueous polymer latex of the invention containing dispersed polymer particles is also required not to cause flocculation or precipitation by addition of a water-miscible organic solvent, and that the dispersed particles are dispersed stably.

It is preferable that the dispersed particles of aqueous polymer latex show no flocculation or precipitation when they are mixed with a hydrophilic colloidal solution, such as gelatin, and that the resulting liquid forms a transparent film after coating and drying on a support.

Such aqueous polymer latex may be prepared e.g. by emulsion copolymerization of ethene monomers having radical-polymerizing capacity. The polymers contain at least one species of compound having hydrophilic group such as sulfo group, sulfonate group, sulfonyl group, carboxy group, carboxylate group, hydroxy group, amide group, sulfonamide group, quaternary ammonium group, polyalkylene oxide group or sulfate group.

The amount of compound having hydrophilic group within the polymer may usually be below 50%, but monomers having hydroxy group as the hydrophilic group may be contained up to 70%.

According to the invention, aqueous polymer latices containing dispersed particles in high concentration up to 60% by weight may be used.

As mentioned above, the aqueous polymer latices used in the invention may be prepared by emulsion copolymerization of ethene monomers having radical-polymerizing capacity. Non-limiting list of monomers to be employed will be given below:

(1) acrylic esters
    methyl acrylate, ethyl acrylate, butyl acrylate, dodecyl acrylate, glycidyl acrylate, 2-acetoacetoxyethyl acrylate, or the like;
(2) methacrylic esters
    methyl methacrylate, ethyl methacrylate, butyl methacrylate, dodecyl methacrylate, glycidyl methacrylate, 2-acetoacetoxyethyl methacrylate, or the like;
(3) acrylic amides
    butyl acrylamide, N, N-diethyl acrylamide, N, N-diisopropyl acrylamide, dodecylacrylamide, or the like;
(4) methacrylic amides
    butyl methacrylamide, N,N-diethyl methacrylamide, dodecyl methacrylamide, N,N-diisopropyl methacrylamide, or the like;
(5) vinyl esters
    vinyl acetate, vinyl butanoate, or the like;
(6) vinyl halides
    vinyl chloride, or the like;
(7) vinylidene halides
    vinylidene chloride, or the like;
(8) vinyl ethers
    vinyl methyl ether, vinyl ethyl ether, vinyl hexyl ether, vinyl glycidyl ether, or the like;
(9) styrene compounds
    styrene, α-methstyrene, hydroxystyrene, chlorostyrene, methylstyrene, or the like;
(10) other compounds
    ethylene, propylene, butylene, butadiene, isoprene, acrylonitrile, or the like;
(11) Compounds having hydrophilic group

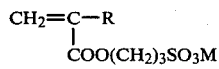 (1)

 (2)

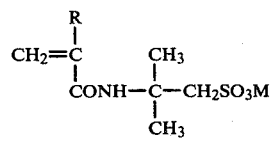 (3)

-continued

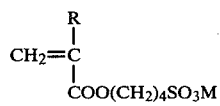 (4)

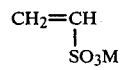 (5)

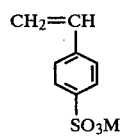 (6)

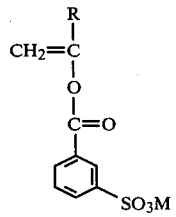 (7)

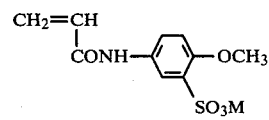 (8)

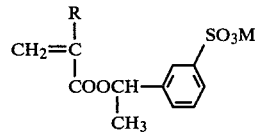 (9)

 (10)

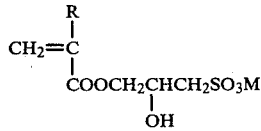 (11)

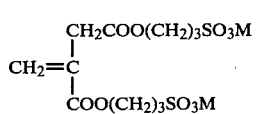 (12)

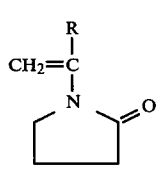 (13)

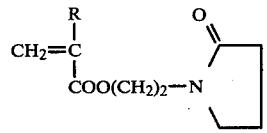 (14)

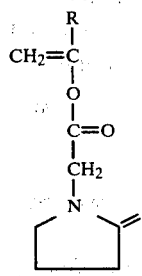 (15)
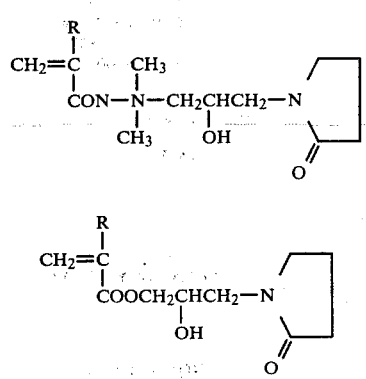 (16)
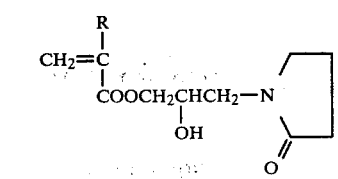 (17)
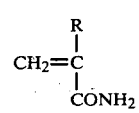 (18)
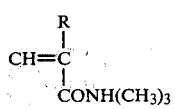 (19)
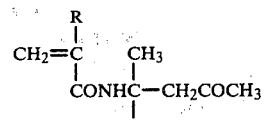 (20)
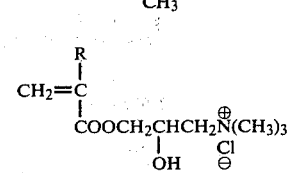 (21)
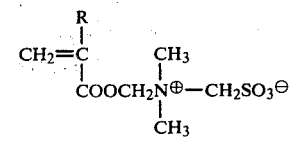 (22)
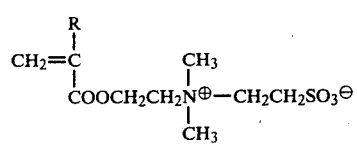 (23)
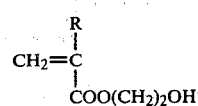 (24)
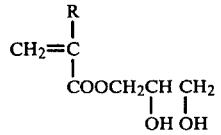 (25)
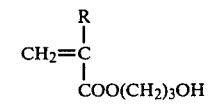 (26)
 (27)
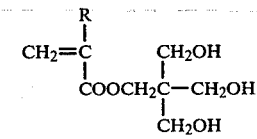 (28)
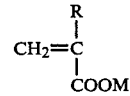 (29)
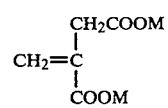 (30)
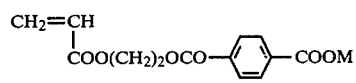 (31)
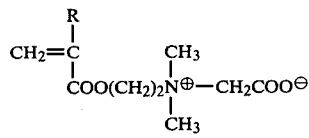 (32)
 (33)
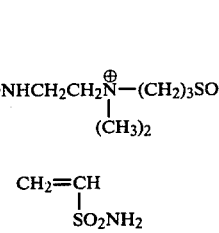 (34)
(35)
$$CH_2=CH$$
$$\quad |$$
$$SO_2NH_2$$
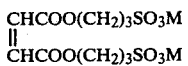 (36)
(In the above formulae, R represents a hydrogen atom or a lower alkyl group and M represents an alkali metal atom, hydrogen atom or ammonium group.)
The following is a non-limiting list of copolymer compositions contained in the aqueous polymer latex of the invention:

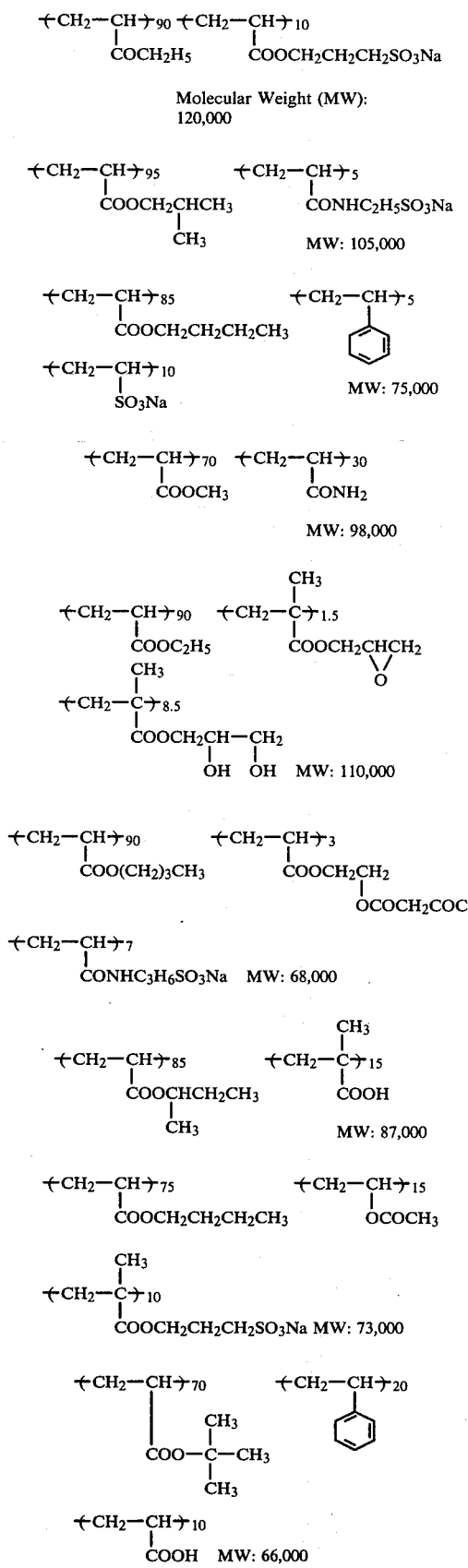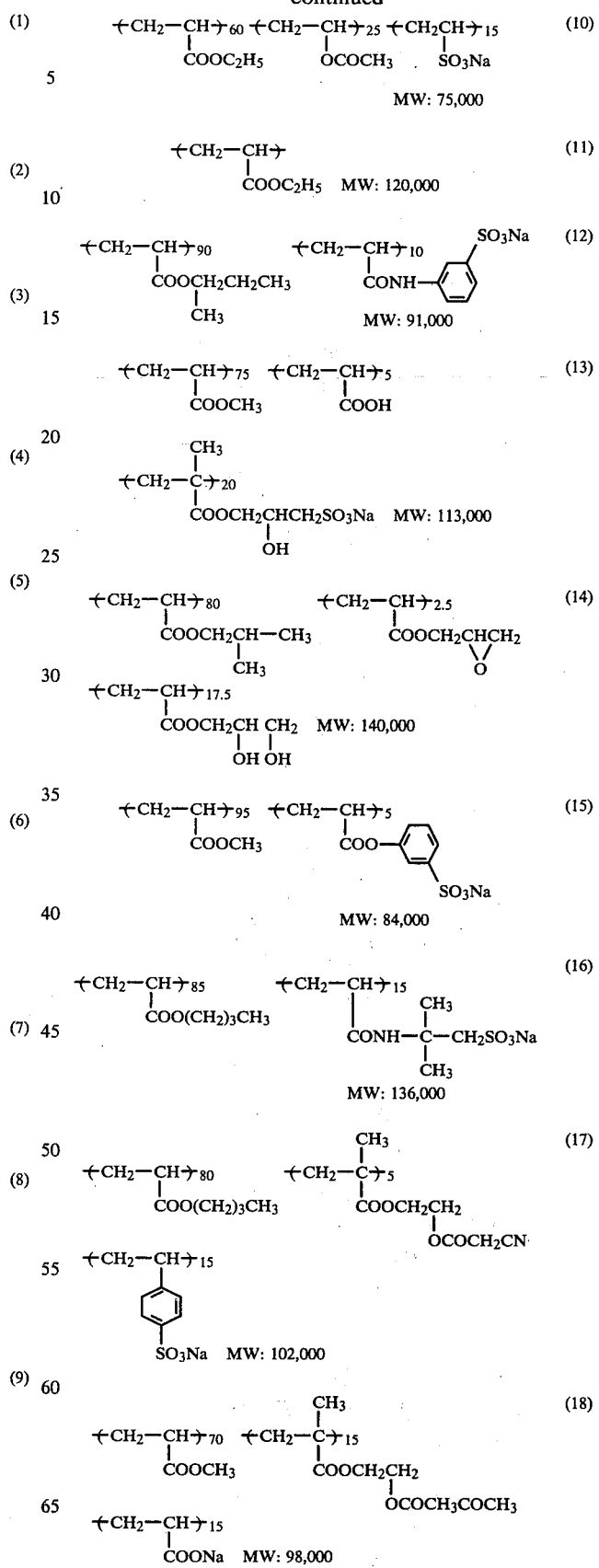

-continued

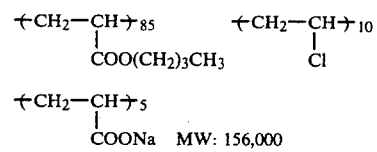
MW: 156,000
(19)

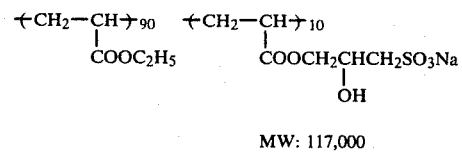
MW: 117,000
(20)

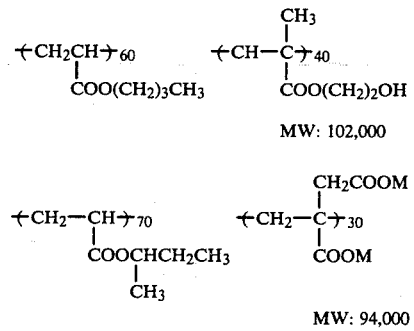
MW: 102,000
(21)

MW: 94,000
(22)

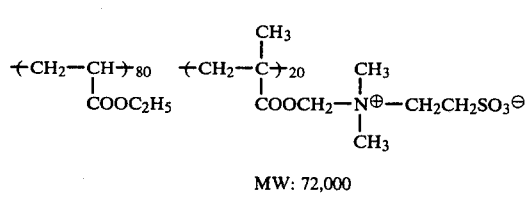
MW: 72,000
(23)

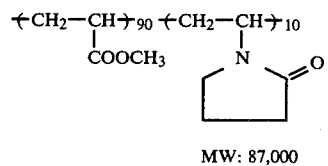
MW: 87,000
(24)

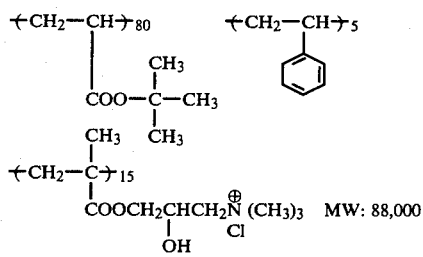
MW: 88,000
(25)

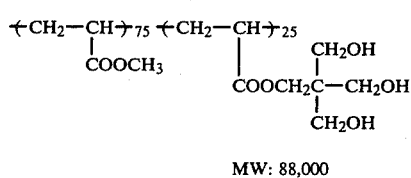
MW: 88,000
(26)

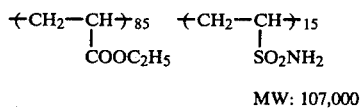
MW: 107,000
(27)

-continued

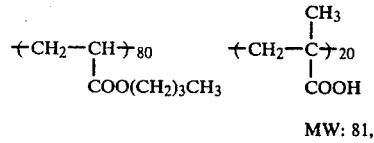
MW: 81,000
(28)

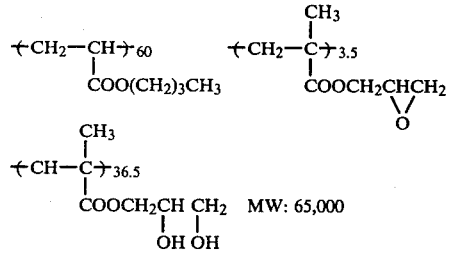
MW: 65,000
(29)

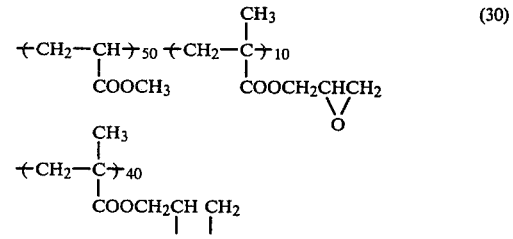
(30)

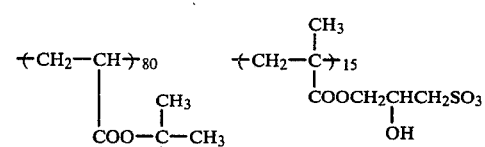
MW: 83,000
(31)

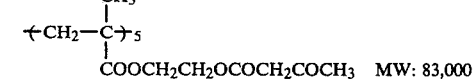
MW: 79,000
(32)

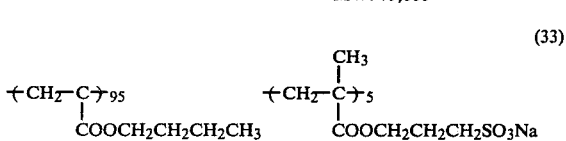
MW: 82,000
(33)

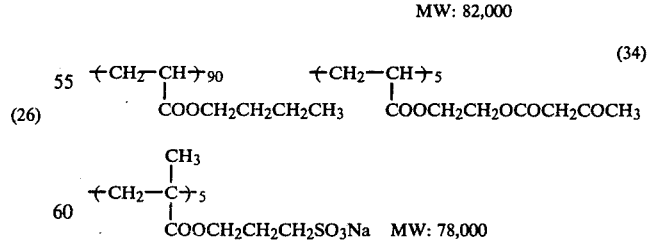
MW: 78,000
(34)

The aqueous polymer latices used in the invention may be synthesized by emulsion copolymerization which is performed under per se know conditions.

For example, an emulsifier, polymerization initiator, polymerization accelerator and polymerization regulator are added, if necessary, to a degasified distilled water, 10–60% by weight of monomer is added thereto and the mixture is heated at 40°–90° C. with stirring for several hours to complete polymerization.

As the emulsifier to be employed, are mentioned, for example, anionic surfactants such as sodium alkylbenzenesulfonate and sodium polyethylene oxide alkyl ether sulfate; nonionic surfactants such as polyethylene oxide alkyl ethers; amphoteric surfactants such as betaine or sulfobetaine type; and cationic surfactants such as quaternary ammonium salts. The surfactant may be used alone or in combination.

As the polymerization initiator to be employed, are mentioned, for example, ammonium persulfate, potassium persulfate and hydrogen peroxide. As the polymerization accelerator to be employed, are mentioned, for example, acid sodium sulfite and acid sodium carbonate.

As the polymerization regulator to be employed, are mentioned, for example, mercaptan compounds, isopropanol and tert-butanol.

There may be employed other additives which will give the reaction good results, if necessary.

The grain size of dispersed polymer particles in the aqueous polymer latex obtained by the method mentioned above will be influenced by various factors, such as species and amounts of emulsifier, monomer and polymerization initiator and preparation conditions (e.g. temperature, reaction period and agitation speed), but it is preferably adjusted to about 0.01–1μ.

The concentration of polymer in the aqueous polymer latex to be used in the invention will be preferably 5–60%, more preferably 5–30% by weight.

Preparations of representative aqueous polymer latices to be employed in the invention will be given below:

PREPARATION 1

Aqueous Dispersion Comprising Illustrated Copolymer No. 1

Necks of a four-necked flask (2 liter) were equipped with a thermometer, cooler, dropping funnel (A) (300 ml) and dropping funnel (B) (300 ml), respectively, and further with a stirrer. To the flask were added 2 g of sodium dodecylbenzene-sulfonate (Newlex R, trade name, Nissan Chem. Co.,) and 600 g of distilled water, and nitrogen gas was introduced for 30 minutes. The mixture was heated to 80° C. and 0.5 g of ammonium persulfate and 0.2 g of acid sodium sulfite were added. Immediately after that, 161.7 g of ethyl acrylate and 38.7 g of sodium 3-acryloyloxypropane-1-sulfonate (200 ml of acqueous solution) were simultaneously added dropwise from the dropping funnels (A) and (B), respectively, over 30 minutes. After completion of addition, the mixture was stirred for 1 hour and cooled to ambient temperature to complete the reaction. The polymer concentration in thus obtained aqueous dispersion was 20% by weight and the grain size of polymer particles was approximately 0.07μ. The molecular weight of the polymer was 120,000.

PREPARATION 2

Aqueous Dispersion Comprising Illustrated Copolymer No. 6

Necks of a four-necked flask (1 liter) were equipped with a thermometer, cooler, dropping funnel (A) (300 ml) and dropping funnel (B) (300 ml), respectively, and further with a stirrer. To the flask were added 2 g of sodium lauryl sulfate (Syntlex L-100, trade name, Nippon Yushi Co.,) and 266 g of distilled water, and nitrogen gas was introduced for 30 minutes. The mixture was heated to 80° C. and 0.5 g of azobiscyanovaleric acid was added. Immediately after that, a mixture of 169.1 g of n-butyl acrylate and 8.8 g of 2-acetoacetoxyethyl acrylate, and 22.1 g of sodium 1-sulfopropyl-3-acrylamide (200 ml of aqueous solution) were simultaneously added dropwise from the dropping funnels (A) and (B), respectively, over 30 minutes. After completion of addition, the mixture was stirred for 1 hour and cooled to ambient temperature to complete the reaction. The polymer concentration of thus obtained aqueous dispersion was 30% by weight and the grain size of polymer particles was approximately 0.09μ. The molecular weight of the polymer was 68,000.

PREPARATION 3

Aqueous Dispersion Comprising Illustrated Copolymer 14

Necks of four-necked flask (2 liter) were equipped with a thermometer, cooler, dropping funnel (300 ml) and stirrer, respectively. To the flask were added 10 g of sodium laurylsulfate (Syntlex L-100, trade name, Nippon Yushi Co.,) and 600 g of distilled water. Nitrogen gas was introduced for 30 minutes and the mixture was heated to 85° C. 0.5 g of potassium persulfate, 0.2 g of acid sodium sulfite and 0.5 g of p-toluenesulfonic acid were added, and immediately after that a mixture of 160 g of isobutyl acrylate and 40 g of glycidyl acrylate was added dropwise from the dropping funnel over 30 minutes. After completion of addition, the mixture was stirred for 15 hours and cooled to ambient temperature to complete the reaction. The polymer concentration of thus obtained aqueous dispersion was 20% by weight and the grain size of polymer particles was approximately 0.1μ. The results of NMR spectrometry and elementary analysis confirmed the polymer composition to be illustrated compound No. 14. The molecular weight of the polymer was 140,000.

PREPARATION 4

Aqueous dispersion comprising illustrated copolymer 15

Necks of four-necked flask (2 liter) were equipped with a thermometer, cooler, dropping funnel (A) (300 ml) and dropping funnel (B) (200 ml), respectively, and further with a stirrer. To the flask were added 2 g of sodium triisopropylnaphthalenesulfonate and 200 g of distilled water. Nitrogen gas was introduced for 30 minutes and the mixture was heated to 75° C. 0.5 g of ammonium persulfate and 0.1 g of acid sodium sulfite were added, and immediately after that, 173.5 g of methyl acrylate, and 100 ml of aqueous solution comprising 26.5 g of sodium 3-acryloyloxyphenyl-1-sulfonate and 0.2 g of sodium sulfite were simultaneously added dropwise from the dropping funnels (A) and (B), respectively, over 30 minutes. After completion of addition, the mixture was stirred for 1 hour and cooled to ambient temperature to complete the reaction. The polymer concentration of thus obtained aqueous disperison was 40% by weight and the grain size of polymer particles was approximately 0.08μ. The molecular weight of the polymer was 84,000.

PREPARATION 5

Aqueous dispersion comprising illustrated copolymer No. 20

Necks of four-necked flask (2 liter) were equipped with a thermometer, cooler, dropping funnel (A) (300 ml) and dropping funnel (B) (300 ml), respectively, and further with a stirrer. To the flask were added 1 g of sodium dodecylbenzenesulfonate (Newlex R, trade name, Nissan Chem. Co.,) and 271 g of distilled water. Nitrogen gas was introduced for 30 minutes and the mixture was heated to 80° C. Immediately after 0.5 g of azobiscyanovaleric acid was added, 159 g of ethyl acrylate and 41 g of sodium 3-acryloyloxypropane-2-hydroxy-1-sulfonate (100 ml of aqueous solution) were simultaneously added dropwise from the dropping funnels (A) and (B), respectively, over 30 minutes. After completion of addition, the mixture was stirred for 1 hour and cooled to ambient temperature to complete the reaction. The polymer concentration of thus obtained aqueous dispersion was 35% by weight and the grain size of polymer particles was approximately 0.09μ. The molecular weight of the polymer was 117,000.

Following the procedures in the Preparations, aqueous polymer latices comprising previously illustrated copolymers may readily be prepared.

Polymer latex compositions in which hydrophobic photographic additives were impregnated according to the process of the invention may be applied to any object to which polymer latex compositions obtained by known methods may be applied.

In accordance with the process of the invention, the previously mentioned objects of the invention may be achieved. Moreover, the grain size of polymer latex in which hydrophobic substance is impregnated, prepared by the process of the invention, is quite uniform.

Accordingly, if the process is applied to couplers, the resulting photographic materials may present better color behavior upon color development, and further, developed color images show better color purity and fastness than those obtained by known methods.

Further, as a result of widening the species of polymers to be chosen, the scope of substances for which impregnation is applied has been expanded by the process of the invention.

It is quite astonishing that the process of the invention may provide above-mentioned remarkable results as compared with known processes, i. a. the closest known process in which an aqueous polymer latex is added to a solution of a hydrophobic substance in a water-miscible organic solvent.

From physicochemical observation of the process in which a hydrophobic substance is dispersed into latex particles, it may be said that the dispersion according to the known process may be performed under severe conditions which, in consequence, restrict the scope of water-miscible solvents, latices, hydrophobic substances and various conditions to be chosen.

The invention is further illustrated by working examples which by no means restrict the scope of the invention.

EXAMPLE 1

To 100 ml of aqueous polymer latex (polymer concentration: 10% by weight) comprising illustrated copolymer No. 1 prepared according to Preparation 1 were added, in one portion, 5 g of yellow dye-forming coupler, or α-(3-benzyl-2,4-dioxoimidazolidin-3-yl)-α-pivaloyl-5-[α'-(2,4-di-tert-amylphenoxy)butylamido]-2-chloroacetanilide in the form of crystals to suspend the coupler in the aqueous polymer latex.

The suspended coupler was rapidly dissolved and impregnated in dispersed polymer particles by adding 100 ml of acetone in small portions. The acetone was distilled out with a rotary evaporator under reduced pressure to give a dispersion (sample 1).

For comparison, 5 g of the above-mentioned yellow dye-forming coupler were dissolved in 100 ml of acetone, and 100 ml of aqueous polymer latex were added dropwise to the solution, with stirring, over 1 minute. After completion of addition, the mixture was stirred for additional 1 minute. At that time, the coupler was dissolved and impregnated on dispersed polymer particles completely. The acetone was distilled out with a rotary evaporator to give a dispersion (comparison 1).

The transmittance at 530 nm (green light) for the representative figure of grain size of polymer dispersion, stability and time required for impregnation were measured with respect to both samples. The results are shown in Table 1.

TABLE 1

|  | Sample 1 | Comparison 1 |
| --- | --- | --- |
| Transmittance (530 nm) | 96.7% | 92.5% |
| Stability (1) | good | a little poor |
| Time required for impregnation | 1.5 min. | 2.5 min. |

Remark (1):
Polymer latex particles after impregnation of coupler were subjected to electron microscopic analysis and determined as follows:
good: No significant change was observed, after mixture, with respect to grain size distribution and presence of precipitate.
a little poor: A little degradation was observed with respect to grain size distribution and presence of precipitate.
poor: Precipitation was observed and grain size became larger.

Similar tests were conducted using 50 ml or 35 ml of acetone (polymer concentration at the time of impregnation: 6.6% and 7.5%, respectively). In accordance with the process of the impregnation, a satisfactory impregnation was achieved with only 35 ml of acetone, while in comparison, precipitate was observed by visual observation with 50 ml or 35 ml of acetone.

Sample 1 and Comparison 1 showed no flocculation during storge and they were fairly compatible with a gelatin solution. After mixing with gelatin solution, they were coated and dried, separately, on transparent photographic supports, giving transparent layers, respectively.

EXAMPLE 2

Following substantially the same procedures as in Example 1, except that aqueous polymer latex containing illustrated copolymer No. 28 and that acetone was replaced by tetrahydrofuran, there was obtained a stable polymer latex composition containing the impregnated coupler.

EXAMPLE 3

To 20 ml of aqueous polymer latex comprising illustrated copolymer No. 1 (polymer concentration: 25% by weight) were added 5 g of cyan dye-forming coupler, or 2-[α-(2,4-di-tert-amylphenoxy)-butyramido]-4,6-dichloro-5-methylphenol as such and stirred to give a suspension.

To the suspension were added 15 ml of tetrahydrofuran (hereinafter referred to as THF) in small portions, with stirring, and after 1-2 minutes the coupler was impregnated in the dispersed polymer particles completely to give a homogeneous dispersion. After this, the coupler was impregnated according to the method of the invention, using aqueous polymer latices having different polymer concentrations. Namely, 5 g of the aforementioned coupler were added, with stirring, to 17 ml of aqueous polymer latex (polymer concentration: 30% by weight) to give a suspension. 15 ml of THF were added to the suspension with stirring, in small portions, and after 1-2 minutes the coupler was impregnated in the dispersed polymer particles completely to give a homogeneous dispersion.

To the dispersions were added 30 ml or 33 ml of pure water, and THF was distilled out under reduced pressure with a rotary evaporator. There was obtained stable polymer latex compositions in which the coupler was impregnated.

From the results, it has turned out that coupler-impregnated stable polymer latex compositions may be obtained even when a concentrated aqueous polymer latex (polymer concentration: >20% by weight) is used.

EXAMPLE 4

Following substantially the same procedures as in Example 2, except that a magenta dye-forming coupler, or 1-(2,4,6-trichloro-phenyl)-3-(2-chloro-5-octadecyl-succinimid-aniline)-pyrazolin-5-one. 30 ml of a 1:1 by volume mixture of acetone and THF as water-miscible organic solvent, and illustrated copolymer No. 6 (polymer concentration: 20% by weight) as aqueous polymer latex were used, respectively, there were obtained similar good results.

EXAMPLE 5

To 100 ml of aqueous polymer latex (polymer concentration: 10% by weight) comprising illustrated copolymer No. 1 used in Example 1 were added, with stirring, 30 ml of water-miscible organic solvent mixture comprising 1:1 acetone and THF, and simultaneously and separately, 5 g of yellow dye-forming coupler, or α-(3-benzyl 2,4-dioxoimidazolidin-3-yl)-α-pivaloyl-5-[α'-(2,4-di-tert-amylphenoxy)butyramido]-2-chloroacetanilide over 1 minute. The coupler was completely impregnated in the dispersed polymer particles and a homogeneous liquid was obtained by further stirring for 1 minute. The solvent was distilled out with a rotary evaporator under reduced pressure, and there was obtained a stable impregnated polymer latex composition.

EXAMPLE 6

100 ml of aqueous polymer latex used in Example 5, the yellow dye-forming coupler used in the same, and 100 ml of acetone as water-miscible solvent were added, simultaneously and separately, into a 500 ml volume beaker over 10 seconds. The coupler was completely and mixing for 1 minute.

The acetone was distilled out with a rotary evaporator under reduced pressure, and there was obtained a stable impregnated polymer latex composition with no flocculation or precipitation.

EXAMPLE 7

5 g of cyan dye-forming coupler, or 2-[α-(2,4-di-tert-amylphenoxy)butyramido]-4,6-dichloro-5-methyl-phenol were dissolved in a mixture of 5 g of dibutyl phthalate and 15 ml of ethyl acetate. To the solution were added 75 ml of 3.5% gelatin solution containing alkylnaphthalensulfonic acid (Alkanol XC, trade name, Dupont Co.,) and the mixture was ultrasonic-dispersed by a usual method to give a dispersion A. Meanwhile, 5 g of the aforementioned cyan dye-forming coupler were added to 50 ml of aqueous polymer latex (polymer concentration: 20% by weight) comprising the illustrated copolymer No. 6 prepared in Preparation 2, as such, and the mixture was stirred to make a suspension. To the suspension were added 30 ml of THF in small portions, and after 1-2 minutes, the coupler was dissolved and impregnated in the dispersed polymer particles, affording a homogeneous dispersion. 50 ml of pure water were added and the THF was distilled out with a rotary evaporator under reduced pressure to give a dispersion C.

Subsequently, 100 ml of the same aqueous polymer latex, the polymer concentration of which was reduced to 10% by weight, were added dropwise to a solution of 5 g of the above-mentioned cyan coupler in 160 ml of THF over 2 minutes. The THF was removed in the similar way to give a dispersion B.

The thus obtained coupler dispersions A, B and C were mixed, respectively, with silver chlorobromide emulsions for red-sensitive paper and coated on photographic paper supports coated with a polymer film as follows:

|  | Comparison 2 | Comparison 3 | Sample 2 |
|---|---|---|---|
| Dispersion | A | B | C |
| Coupler (mg/dm$^2$) | 7.4 | 7.8 | 7.2 |
| Silver (mg/dm$^2$) | 4.1 | 4.2 | 4.0 |
| Gelatin (mg/dm$^2$) | 38.2 | 39.0 | 37.3 |

The specimens were wedge-exposed and developed at 25° C. for 4 minutes, according to usual method, with a developer having the following composition:

| 2-Methyl-4-(N—ethyl-N—β-methanesulfonamidoethyl-amino) aniline 3/2 sulfate | 4.5 g |
|---|---|
| Sodium carbonate monohydrate | 20 g |
| Potassium bromide | 2.0 g |
| Sodium sulfite | 3.0 g |
| Hydroxylamine sulfate | 2.0 g |
| Sodium hexametaphosphate | 2.0 g |
| Benzyl alcohol | 10 ml |
| Water | to make 1 liter (pH = 10.1) |

The results are shown in Table 2.

TABLE 2

|  | Relative speed | D max. | γ | D min. |
|---|---|---|---|---|
| Comparison 2 | 100 | 2.55 | 3.20 | 0.05 |
| Comparison 3 | 98 | 2.41 | 3.01 | 0.03 |
| Sample 2 | 100 | 2.52 | 3.10 | 0.03 |

Here, the relative speed means a relative sensitivity when Comparison 2 is 100.

From the above results, it has turned out that the process of the invention requires not so much solvent as in known processes and gives the same grade of photographic characteristics.

EXAMPLE 8

The Comparisons 2 and 3 and Sample 2 were processed in the similar manner as in Example 7 and subjected to acceleration tests at 50° C. and 80% relative humidity for 2 weeks.

The rates of remained dyes of colored dyes at D max part were compared and the results are shown in Table 3.

TABLE 3

|  | D max | | | |
| --- | --- | --- | --- | --- |
|  | Before processing | After processing | Remaining rate | Remarks |
| Comparison 2 | 2.55 | 1.90 | 78.4% | turned to green |
| Comparison 3 | 2.41 | 2.23 | 92.5% | |
| Sample 2 | 2.52 | 2.31 | 91.7% | |

As is clear from Table 3, Sample 2 according to the invention shows better image preservability than that of Comparison 2 and possesses characteristics comparable to those of Comparison 3.

EXAMPLE 9

A solution of 10 g of magenta dye-forming coupler, or 4,4'-bis{1-(2,4,6-trichlorophenyl)-3-[3-(2,4-di-tert-amylphenoxyacetamido)benzamido]-pyrazolin-5-one} and 1.2 g of DIR substance, or 2-(1-phenyltetrazolyl-5-thio)-4-octadecylsuccinimido)indanone in a mixture of 10 g of tricresyl phosphate and 30 ml of ethyl acetate was added to 75 ml of 3.5% gelatin solution containing Alkanol XC (trade name) as a dispersant, and the mixture was protect-dispersed with a colloid mill according to a conventional method to give a dispersion D.

Subsequently, 10 g of the above-mentioned magneta dye-forming coupler and 1.2 g of the DIR substance were added to 50 ml of aqueous polymer latex (polymer concentration: 20% by weight) comprising the illustrated copolymer No. 20 prepared in Preparation 5, and the mixture was stirred to make a suspension.

To the suspension were added 30 ml of 1:1 by volume mixture of acetone and THF, and then the coupler and DIR substance were completely dissolved in the solvent and impregnated in dispersed polymer particles within 1-2 minutes to give a homogeneous liquid, dispersion E.

The dispersions D and E were mixed with green-sensitive color negative silver iodobromide emulsions and coated on triacetate bases, respectively, to make specimens as follows:

|  | Dispersion | Coupler (mg/dm$^2$) | Silver (mg/dm$^2$) |
| --- | --- | --- | --- |
| Comparison 4 | D | 9.2 | 12.0 |
| Sample 3 | E | 9.1 | 11.9 |

The specimens were wedge-exposed and processed according to developing process for Sakura Color II. The results are shown in Table 4.

TABLE 4

|  | Relative sensitivity | D max | γ | D min |
| --- | --- | --- | --- | --- |
| Comparison 4 | 100 | 2.2 | 0.82 | 0.21 |
| Sample 3 | 97 | 2.0 | 0.79 | 0.16 |

From the results in Table 4, it has turned out that when the process of the invention is applied to the dispersion of DIR substance, it shows characteristics comparable to those obtained by known methods.

Here, the relative sensitivity means a sensitivity when the comparison is 100. Besides, according to the process of the invention, better characteristics like granule property were obtained.

EXAMPLE 10

To 75 ml of aqueous polymer latex (polymer concentration: 20% by weight) comprising the illustrated copolymer No. 6 were added 12 g of DRR substance, or 4-[3-{5-hydroxy-6-(2'-methylsulfonyl-4'-nitro-phenylazo)-1-tert-butylaminosulfonyl}benzenesulfonamido]-1-hydroxy-2-[Δ-(2,4-di-tert-amylphenoxy)-n-butyl]naphthamide, and 50 ml of THF were added, with stirring. After 1-2 minutes, the DRR substance was dissolved and impregnated in the dispersed polymer particles and a homogeneous liquid was obtained. The THF was removed with a rotary evaporator under reduced pressure to give a homogeneous dispersion of DRR substance. Meanwhile, a dispersion for comparison was prepared according to usual protect dispersion, using diethyllaurylamide as a high boiling point solvent.

Subsequently, the both dispersions were first mixed with negative silver bromide emulsions, then added a hardener and spreader, and finally coated on polyester film bases as under, respectively, according to the method disclosed in Japanese Patent Publication 47-126331, as laid open to public inspection, to give photographic light-sensitive elements as follows:
DRR substance, $1.1 \times 10^{-5}$ mol/dm$^2$
Silver, 10 mg/dm$^2$
gelatin, 33 mg/dm$^2$ Following this, an image-receiving element was prepared by coating, on a polyester film base, a mortant layer consisting of 25 mg/dm$^2$ of poly (styrene, 2-vinylbenzyl chloride, 2-N-benzyl-N,N-dimethyl-N-vinylbenzyl-ammonium chloride, 2-divinylbenzene) in molar ratio of 4.90:0.49:4.41:0.2 and 13 mg/dm$^2$ of gelatin.

The above-mentioned photographic light-sensitive element was wedge-exposed and piled up on the image-receiving element. The thus obtained sandwitch structure was passed through a pair of press rollers to introduce the under-mentioned viscous processing solution between the sandwitch structure:

| Sodium hydroxide | 40 g |
| --- | --- |
| 4-Hydroxymethyl-4-methyl-1-phenyl-5-pyrazolidone | 4 g |
| 5-Methylbenzyltriazole | 0.1 g |
| Potassium bromide | 0.1 g |
| Hydroxyethylcellulose | 25 g |
| Distilled water | to make 1 liter |

After 90 seconds, the image-receiving element was stripped off and washed with water to adjust pH to 7. Good cyan printed images were obtained on the image-receiving elements. The results are given in Table 5.

TABLE 5

|  | Relative sensitivity | Fog | D max |
| --- | --- | --- | --- |
| Comparison | 100 | 0.20 | 1.84 |
| Present process | 104 | 0.18 | 1.88 |

Better results were obtained according to the process of the invention than known methods with respect to both sensitivity and D max.

EXAMPLE 11

To a mixture of 6 g of dibutyl phthalate and 20 ml of ethyl acetate were dissolved, as UV absorbents, 2.0 g of 2-benzotriazolyl-4-tert-butylphenol, 1.5 g of 2-benzotriazolyl-4,6-di-tert-butylphenol, 2.5 g of 2-(5-chlorobenzotriazolyl)-4,6-di-tert-butylphenol and 2.5 g of 2-(5-chlorobenzotriazolyl)-4-methyl-6-tert-butylphenol. The resulting solution was protect-dispersed in a gelatin solution with a colloid mill according to a usual method to give a dispersion F.

After this, the same amounts mixture of the above-mentioned UV absorbents were added to 30 ml of aqueous polymer latex used in Example 4 and suspended. To the suspension were added 20 ml of THF, with stirring, so that the UV absorbents were completely dissolved and impregnated in the dispersed polymer particles within 1–2 minutes to give a homogeneous liquid. The organic solvent was removed with a rotary evaporator under reduced pressure to give a dispersion H. Further, 8.5 g of a mixture of the above-mentioned UV absorbents were dissolved in 100 ml of acetone, and to the solution were added dropwise 60 ml of above-mentioned aqueous polymer latex (polymer concentration: 10% by weight) over 1 minute. After completion of addition, the acetone was removed with a rotary evaporator under reduced pressure to give a dispersion G.

The dispersion F, G and H were mixed with photographic gelatin solutions and coated, respectively, on photographic triacetate bases so that the coated amounts of gelatin and UV absorbents were equal. The optical densities at 370 nm and 415 nm of thus obtained specimens were measured with a spectrophotometer and the results are shown in Table 6.

TABLE 6

| | Gelatin (g/m$^2$) | UV absorbents (g/m$^2$) | Optical density | |
|---|---|---|---|---|
| | | | 370 nm | 415 nm |
| Dispersion F (Comparison 1) | 0.55 | 0.20 | 1.60 | 0.43 |
| Dispersion G (Comparison 2) | 0.55 | 0.20 | 3.00 | 0.11 |
| Dispersion H (Present invention) | 0.55 | 0.20 | 2.88 | 0.11 |

As is clear from above results, the UV absorbents impregnated dispersion prepared by the process of the invention shows a high level optical density in ultraviolet region and a clear cut-off characteristic in visual wave region, as compared with those prepared by the known protect-dispersion method.

Further, the dispersion prepared by the process of the invention shows effects comparable to those prepared by the aqueous polymer latex dispersion method disclosed in Japanese Patent Publication No. 51-59943, as laid open to public inspection; while the amount of organic solvent used in the dispersing process of the invention was reduced to 1/5 and the time required for removing solvent was remarkably shortened.

EXAMPLE 12

To 100 ml of aqueous polymer latex (polymer concentration: 10% by weight) comprising illustrated copolymer No. 1 were added 100 ml of acetone.

To the polymer latex containing the acetone were added, in one portion, 5 g of yellow dye-forming coupler, or α-(3-benzyl-2,4-dioxoimidazolidin-3-yl)-α-pivaloyl-5-[α'-(2,4-di-tert-amylphenoxy)butyramido]-2-chloroacetanilide in the form of crystals, with stirring. After additional stirring for 1–2 minutes, the coupler was completely dissolved. The acetone was removed under reduced pressure with a rotary evaporator to give a dispersion (Sample 4). For comparison, Comparison 1 used in Example 1 was employed here again.

The transmittance at 530 nm (green light) for the representative figure of grain size of polymer dispersion, stability and time required for impregnation were measured with respect to both samples. The results are shown in Table 7.

TABLE 7

| | Sample 4 | Comparison 1 |
|---|---|---|
| Transmittance (530 nm) | 97.5% | 93.0% |
| Stability | good | a little poor |
| Time required for impregnation | 1.5 min. | 2.5 min. |

Similar tests were conducted using 50 ml or 35 ml of acetone. In accordance with the process of the invention, a satisfactory impregnation was achieved with only 35 ml of acetone, while in comparison, precipitate was observed by visual observation with 50 ml or 35 ml of acetone. Sample 4 and Comparison 1 showed no flocculation during storage and they were fairly comparable with gelatin solution. After mixing with gelatin solution, they were coated and dried, separately, on transparent photographic supports, giving transparent layers, respectively.

EXAMPLE 13

Following substantially the same procedures as in Example 12, except that aqueous polymer latex containing illustrated copolymer No. 28 was used and that acetone was replaced by tetrahydrofuran, there was obtained a stable polymer latex composition containing the impregnated coupler.

EXAMPLE 14

To 20 ml of aqueous polymer latex comprising illustrated copolymer No. 1 (polymer concentration: 25% by weight) were added 15 ml of THF. To the mixture were added 5 g of cyan dye-forming coupler, or 2-[α-(2,4-di-tert-amylphenoxy)-butyramido]-4,6-dichloro-5-methylphenol as such, and after stirring for 1–2 minutes, the coupler was completely dissolved to give a homogeneous dispersion.

After this, the coupler was immersed according to the method of the invention, using aqueous polymer latices having different polymer concentrations.

Namely, 15 ml of THF were added to 17 ml of latex (polymer concentration: 30% by weight) and then 5 g of cyan coupler, or 2-[α-(2,4-di-tert-amylphenoxy)-butyramido]-4,6-dichloro-5-methylphenol were added as such. The stirring was continued for 1–2 minutes to give a homogeneous dispersion, dissolving the coupler completely.

To the dispersion were added 30 ml or 33 ml of pure water. The THF was removed under reduced pressure with a rotary evaporator, and there were obtained, with no flocculation or precipitation of crystals, stable polymer latex compositions in which the coupler was impregnated. From the results, it has turned out that coupler-impregnated stable polymer latex compositions may be obtained by the process of the invention even when a concentrated aqueous polymer latex (polymer concentration: >20% by weight) is used.

EXAMPLE 15

Following substantially the same procedures as in Example 14, except that a magenta dye-forming coupler, or 1-(2,4,6-trichlorophenyl)-3-(2-chloro-5-octadecylfuccinimidoanilino)-tyrazolin-5-one, 30 ml. of a 1:1 volume mixture of acetone and THF as water-miscible organic solvent, and illustrated copolymer No. 6 (polymer concentration: 20% by weight) as aqueous polymer latex were used, respectively, there were obtained similar good results.

EXAMPLE 16

5 g of cyan dye-forming coupler, or 2-[α-(2,4-di-tert-amylphenoxy)butyramido]-4,6-dichloro-5-methyl phenol were dissolved in a mixture of 5 g of dibutyl phthalate and 15 ml of ethyl acetate, and then 75 ml of gelatin solution containing alkylnaphthalenesulfonic acid (Alkanol XC, trade name, Dupont Co.,) as dispersing agent were added. The mixture was ultrasonic-dispersed by a usual method to give a dispersion A.

Meanwhile, 30 ml of THF were added to 50 ml of aqueous polymer latex (polymer concentration: 20% by weight), and then 5 g of the above-mentioned cyan dye-forming coupler were added as such and stirred. By stirring the mixture for 1–2 minutes, there was obtained a homogeneous dispersion. 50 ml of pure water were added to the dispersion, and the THF was removed with a rotary evaporator under reduced pressure to give a dispersion I. After this a dispersion B was prepared in the same way as in Example 7.

The thus obtained coupler dispersions A, B and I were mixed, respectively, with silver halide emulsions for red-sensitive paper and coated on photographic polymer film supports as follows:

|  | Comparison 2 | Comparison 3 | Sample 5 |
|---|---|---|---|
| Dispersion | A | B | I |
| Coupler (mg/dm$^2$) | 7.4 | 7.8 | 8.0 |
| Silver (mg/dm$^2$) | 4.1 | 4.2 | 4.5 |
| Gelatin (mg/dm$^2$) | 38.2 | 39.0 | 40.5 |

The specimens were wedge-exposed and developed at 25° C. for 4 minutes with a developer having the same composition as in Example 7, and the results are shown in Table 8.

TABLE 8

|  | Relative speed | D max | γ | D min |
|---|---|---|---|---|
| Comparison 2 | 100 | 2.55 | 3.20 | 0.05 |
| Comparison 3 | 89 | 2.41 | 3.01 | 0.03 |
| Sample 5 | 100 | 2.58 | 3.10 | 0.03 |

From the above results, it has turned out that the color properties are not deteriorated by the process of the invention, using a low energy dispersion and a smaller amount of solvent, as compared with known processes.

EXAMPLE 17

The comparisons 2 and 3 and Sample 5 were processed in the similar manner as in Example 16 and subjected to acceleration tests at 50° C. and 80% relative humidity for 2 weeks. The rates of remained dyes of colored dyes at D max part were compared and the results are shown in Table 9.

TABLE 9

|  | D max | | | |
|---|---|---|---|---|
|  | Before processing | After processing | Remaining rate | Remarks |
| Comparison 2 | 2.55 | 1.90 | 76.4% | turned to green |
| Comparison 3 | 2.50 | 2.23 | 90.0% |  |
| Sample 5 | 2.61 | 2.38 | 91.2% |  |

As is clear from Table 9, Sample 5 according to the invention shows better image preservability than that of Comparison 2 and possesses characteristics comparable to those of Comparison 3.

EXAMPLE 18

A solution of 10 g of magenta dye-forming coupler, or 4,4'-bis{1-(2,4,6-trichlorophenyl)-3-[3-(2,4-di-tert-amylphenoxyacetamido)benzamido]-pyrazolin-5-one} and 1.2 g of 2-(1-phentyltetrazolyl-5-thio)-4-octadecylsuccinimido)indanone in a mixture of 10 g of tricresyl phosphate and 30 ml of ethyl acetate was added to 75 ml of 3.5% gelatin solution containing Alkanol XC (trade name) as a dispersant, and the mixture was protect-dispersed with a colloid mill according to a conventional method to give a dispersion D.

Subsequently, 30 ml of a 1:1 by volume mixture of acetone and THF were added to 50 ml of aqueous polymer latex (polymer concentration: 20% by weight) comprising the illustrated copolymer No. 20. After this, 10 g of the above-mentioned magenta dye-forming coupler and 1.2 g of the DIR substance were added to the polymer latex, and stirring was continued for 1–2 minutes to give a homogeneous dispersion J.

The dispersions D and J were mixed with green-sensitive color negative silver iodobromide emulsions and coated on triacetate bases, respectively to make specimens as follows:

|  | Dispersion | Coupler (mg/dm$^2$) | Silver (mg/dm$^2$) |
|---|---|---|---|
| Comparison 4 | D | 9.2 | 12.0 |
| Sample 6 | J | 9.5 | 12.3 |

The specimens were wedge-exposed and processed according to developing process for Sakura Color II The results are shown in Table 10.

TABLE 10

|  | Relative sensitivity | D max | γ | Fog |
|---|---|---|---|---|
| Comparison 4 | 100 | 2.2 | 0.82 | 0.21 |
| Sample 6 | 98 | 2.1 | 0.79 | 0.18 |

EXAMPLE 19

To a mixture of 75 ml of aqueous polymer latex (polymer concentration: 20% by weight) identical with that used in Example 15 and 50 ml of THF were added 12 g of DRR compound which is identical with that used in Example 10. After 1–2 minutes, the DRR substance was dissolved and the THF was removed under reduced pressure with a rotary evaporator to give a homogeneous dispersion.

By using the above-mentioned polymer latex impregnated with the DDR compound, the following photographic element was coated according to the method disclosed in Japanese Patent Publication No. 47-126331, as laid open to public inspection.

First, the dispersion was mixed with a negative silver bromide emulsion, then added a hardener and spreader, and coated on a polyester base to give the following photographic element:
DRR compound, $1.2 \times 10^{-5}$ mol/dm$^2$
Silver, 10.1 mg/dm$^2$
Gelatin, 35.0 mg/dm$^2$ Meanwhile, an image-receiving element was prepared in the same way as in Example 10.

The mordant layer light-sensitive element was wedge-exposed and piled up on the image-receiving element and the resulting sandwitch structure was passed through a pair of press rollers to introduce a viscous processing solution having the same composition as in Example 10.

After 90 seconds, the image-receiving element was stripped off and washed with water to adjust pH to 7. A good cyan printed image was obtained on the image-receiving element.

For comparison, a similar test was performed, using an identical specimen except that diethyl laurylamide was used as a high boiling point solvent in place of the polymer latex and that a DRR compound dispersion was obtained according to a known dispersing method. The comparative results are given in Table 11.

TABLE 11

|  | Relative sensitivity | Fog | D max |
|---|---|---|---|
| Comparison | 100 | 0.20 | 1.84 |
| Present process | 102 | 0.18 | 1.85 |

Quite comparable sensitometric effects were obtained.

EXAMPLE 20

Dispersion F and G were prepared in the same manner as in Example 11.

Meanwhile, 8.5 g of mixed UV absorbents having the same composition as in Example 11 were added, as such, to a mixture of 30 ml of aqueous polymer latex comprising the illustrated compound No. 6 (polymer concentration: 20% by weight) and 20 ml of THF to make a colloidal, homogeneous dispersion K.

The dispersions F, G and K were separately mixed with photographic gelatin solutions and coated on photographic triacetate bases so that the coated amounts of gelatin and UV absorbents were equal.

The optical densities at 370 nm and 415 nm of thus obtained specimens were measured with a spectrophotometer and the results are shown in Table 12.

TABLE 12

|  | Gelatin (g/m$^2$) | UV absorbent (g/m$^2$) | Optical density | |
|---|---|---|---|---|
|  |  |  | 270 nm | 415 nm |
| Dispersion F (Comparison 1) | 0.55 | 0.20 | 1.60 | 0.43 |
| Dispersion G (Comparison 2) | 0.55 | 0.20 | 3.00 | 0.11 |
| Dispersion K (present invention) | 0.55 | 0.20 | 2.98 | 0.10 |

From the above results, Dispersion K according to the process of the invention shows a UV absorption at a very high level and a sharp cut-off effect at a visual wave region, comparable to those prepared by the method disclosed in Japanese Patent Publication No. 51-59943, as laid open to public inspection.

EXAMPLE 21

Tests were conducted following substantially the same procedures as in Example 20, except that an aqueous polymer latex comprising the illustrated compound No. 29 was used in place of Compound No. 6 and that the amount of the UV absorbents were reduced to ¼. The results revealed that nearly the same tendency was observed as in Example 20.

What is claimed is:

1. In the process for preparing impregnated polymer latex compositions by impregnating a hydrophobic substance into dispersed polymer particles in an aqueous polymer latex, the improvement comprising impregnating said hydrophobic substance, wherein the impregnation is effected by mixing said hydrophobic substance which is in the solid state, with a water-miscible organic solvent and the aqueous polymer latex comprising a dispersion of said polymer particles in water, said polymer of the polymer latex is prepared from ethene monomers and contains at least one hydrophilic group, said mixing which effects said impregnation being carried out by one of the following four mixing operations:

(i) forming a suspension of particles of said hydrophobic substance in said aqueous polymer latex and then adding small portions of said water-miscible organic solvent to said suspension;

(ii) adding and mixing particles of said hydrophobic substance, and said water-miscible organic solvent, from different hoppers to said aqueous polymer latex at the same time;

(iii) adding and mixing said aqueous polymer latex, particles of said hydrophobic substance, and said water-miscible organic solvent or in one receptacle at the same time; or (iv) adding and mixing particles of said hydrophobic substance to a mixture of said aqueous polymer latex and a water-miscible organic solvent;

whereby said solid state hydrophobic substance is gradually dissolved by said water-miscible solvent while said dissolved hydrophobic substance is being impregnated into said dispersed polymer particles, and finally said polymer particles are finely dispersed in a medium comprising water and said water-miscible solvent.

2. The process as claimed in claim 1, wherein said mixing which effects said impregnation is carried out by said mixing operation (i).

3. The process as claimed in claim 1, wherein said mixing which effects said impregnation is carried out by said mixing operation (ii).

4. The process as claimed in claim 1, wherein said mixing which effects said impregnation is carried out by said mixing operation (iii).

5. The process as claimed in claim 1, wherein said mixing which effects said impregnation is carried out by said mixing operation (iv).

6. The process as claimed in claim 1, wherein the ethene monomer has radical polymerizing capacity by way of emulsion copolymerization, said polymer comprising at least one compound having at least one hydrophilic group selected from the group consisting of sulfo group, sulfonate group, sulfonyl group, carboxy group, carboxylate group, hydroxy group, amide group, sulfonamide group, quaternary ammonium group, polyalkylene oxide group and sulfate group.

7. The process as claimed in claim 1, wherein the polymer of the aqueous polymer latex contains 1–50% by weight of monomer units having hydrophilic group selected from the group consisting of carboxy group, carboxylate group, sulfo group, sulfonate group, sulfonyl group and sulfate group.

8. The process as claimed in claim 1, wherein the polymer of the aqueous polymer latex contains 10–70% by weight of monomer units having hydroxy group.

9. The process as claimed in claim 1, wherein the polymer of the aqueous polymer latex contains 2–50% by weight of monomer units having hydrophilic group selected from the group consisting of carboxy group, carboxylate group, sulfo group, sulfonate group, sulfate group and sulfonyl group, and 0.2–10% by weight of monomer units having active methylene group.

10. The process as claimed in claim 1, wherein the polymer concentration of the aqueous polymer latex is below 50% by weight.

11. The process as claimed in claim 1, wherein the hydrophobic substance is a hydrophobic photographic additive.

12. The process as claimed in claim 11, wherein the hydrophobic photographic additive is a dye-forming agent, a UV absorbent, a developing inhibitor-releasing substance, a cross oxidation dye-releasing agent or a photographic dye.

13. The process as claimed in claim 1, wherein the water-miscible organic solvent is miscible in water in an amount more than 10% by weight.

14. The process of claim 1, consisting essentially of mixing particles of said hydrophobic substance with said water-miscible organic solvent and said aqueous polymer latex wherein a polymer of the polymer latex is prepared from ethene monomers and contains at least one hydrophilic group, whereby said solid state hydrophobic substance is gradually dissolved by said water-miscible solvent while said dissolved hydrophobic substance is being impregnated into said dispersed polymer particles.

15. In the process for preparing impregnated polymer latex compositions by impregnating a hydrophobic substance into dispersed polymer particles in an aqueous polymer latex, the improvement comprising impregnating said hydrophobic substance, wherein the impregnation is effected by mixing said hydrophobic substance which is in the solid state, with a water-miscible organic solvent and the aqueous polymer latex comprising a dispersion of said polymer particles in water, said polymer of the polymer latex is prepared from ethene monomers and contains at least one hydrophilic group, said mixing which effects said impregnation being carried out by one of the following four mixing operations:

(i) forming a suspension of particles of said hydrophobic substance in said aqueous polymer latex and then adding small portions of said water-miscible organic solvent to said suspension; or (ii) adding and mixing particles of said hydrophobic substance, and said water-miscible organic solvent, from different hoppers to said aqueous polymer latex at the same time;

whereby said solid state hydrophobic substance is gradually dissolved by said water-miscible solvent while said dissolved hydrophobic substance is being impregnated into said dispersed polymer particles.

16. The process as claimed in claim 1, wherein said mixing which effects said impregnation is carried out by the said mixing operation (i).

17. The process as claimed in claim 1, wherein said mixing which effects said impregnation is carried out by the said mixing operation (ii).

* * * * *